UNITED STATES PATENT OFFICE.

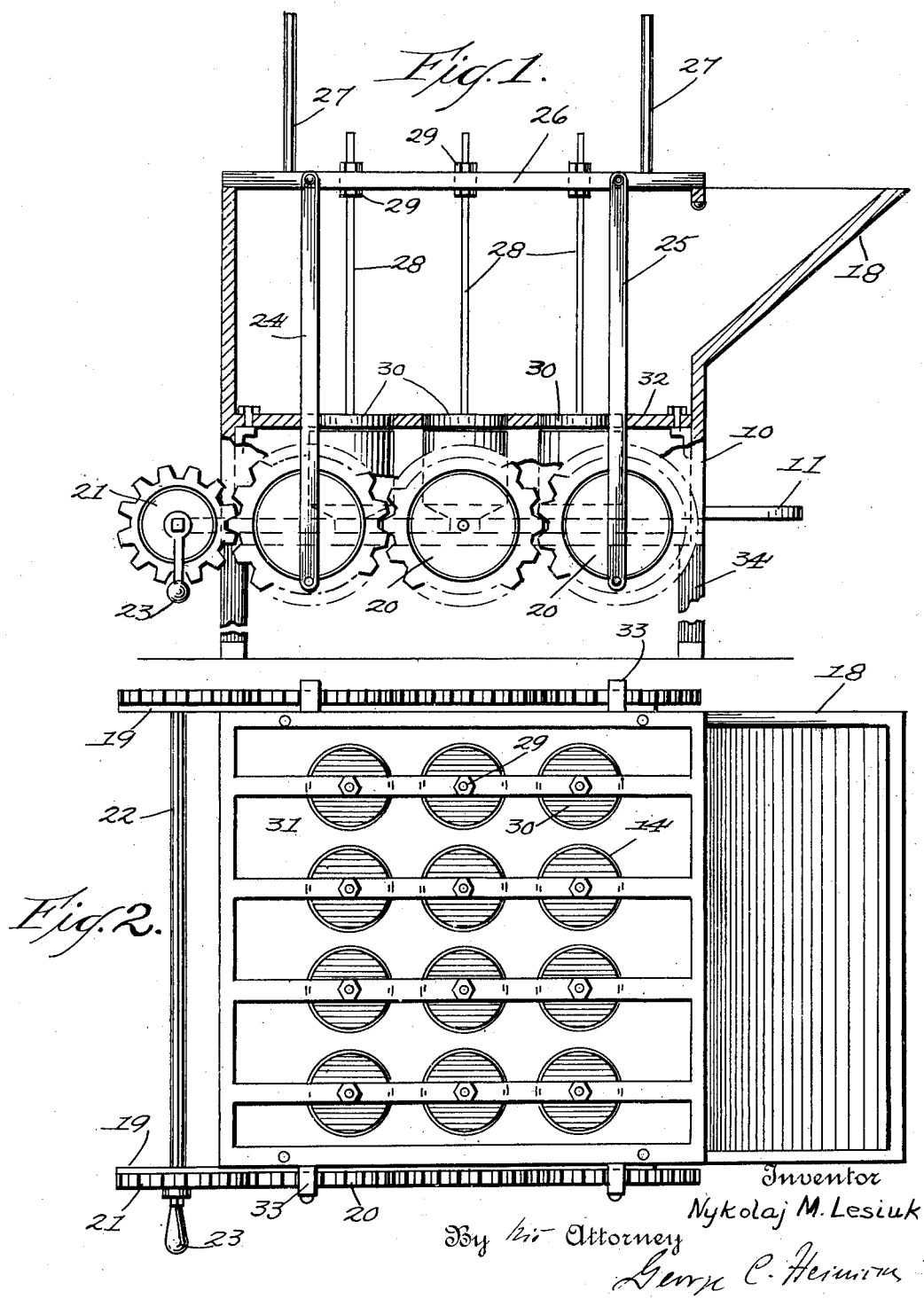

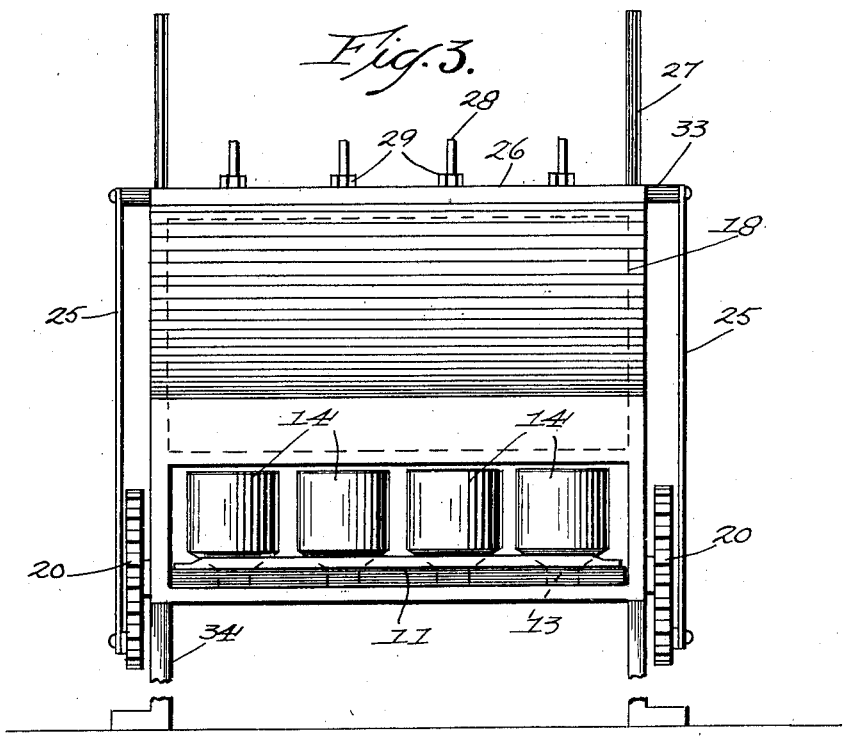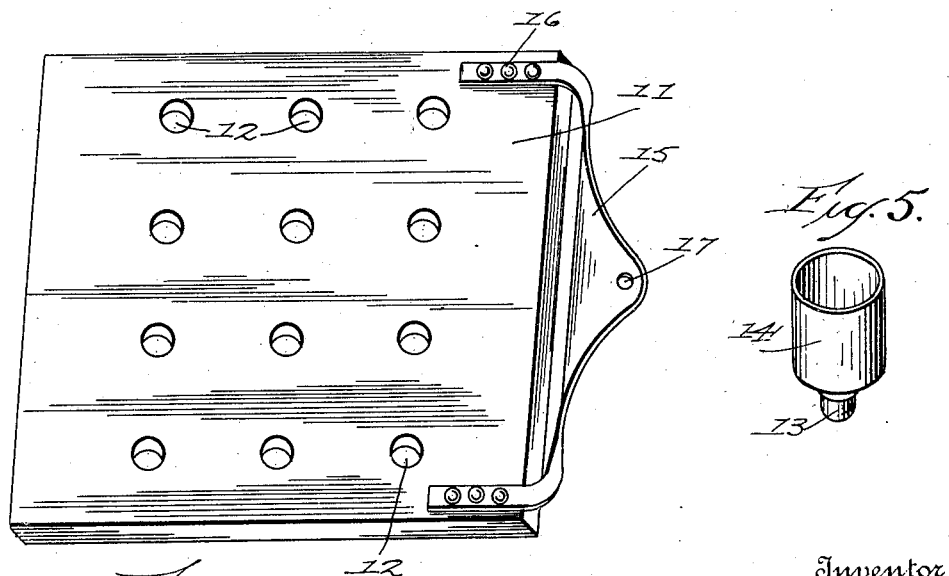

NYKOLAJ M. LESIUK, OF NEW YORK, N. Y.

MUFFIN-FORMING MACHINE.

1,369,447.  Specification of Letters Patent.  Patented Feb. 22, 1921.

Application filed May 25, 1920. Serial No. 384,042.

*To all whom it may concern:*

Be it known that I, NYKOLAJ M. LESIUK, a citizen of Ukraine, residing at New York, county of New York, and State of New York, have invented certain new and useful Improvements in Muffin-Forming Machines, of which the following is a specification.

My invention relates to a machine for filling dough containers or pans especially in muffin bakeries in preparation for the baking oven.

It is the object of my invention to simultaneously fill a plurality of muffin dough containers or pans in an easy and expedient manner.

A further object of the invention is to provide a machine of this character in which the dough containers are all arranged on a removable plate adapted to be removed from the machine after being filled and transferring a plurality of such containers at one time to the baking oven.

My improvements consist in the peculiar construction and combination of parts hereinafter fully described and claimed, reference being had to the accompanying drawings, which form part of this specification, in which—

Figure 1 is a side elevation of my machine constructed according to the invention partly in section.

Fig. 2 is a top plan view thereof.

Fig. 3 is a front view of the machine.

Fig. 4 shows a muffin dough pan carrying plate, and

Fig. 5 is a detail view of one of the dough containers.

Referring more particularly to the drawings, 10 is the machine frame adapted to removably receive in its lower part, a plate 11 having a plurality of openings or sockets 12 adapted to receive and retain the tenons 13 at the bottoms of the dough containers 14.

The plate 11 is provided at its front edge with a handle 15 secured to the plate by bolts 16 or the like and provided with a central hole or opening 17 for suspending the plate or plates from a nail when it is not in use.

At its upper front part the frame has a hopper 18 for supplying the machine with the muffin dough.

At both of its sides the machine is provided with plates 19 secured to the frame and constituting a means for supporting the shafts of a number of gears 20, adapted to be operated from a gear 21 on a shaft 22, the outer end of which carries a crank 23 so that upon the operation of said crank and gear 21 the gears 20 will execute a revolution in one or the other direction.

To the front faces of the two outer gears 20 in the center thereof are secured two vertical rods 24 and 25, the free upper ends of which are secured to a horizontal frame or plate 26 resting upon the upper edge of the frame 10 adapted to be carried up and down along bars 27 during the operation of the gears.

Intermediate the rods 24 and 26, other rods 28 are arranged, their number being equal to the number of muffin pans 14 on the plate 11.

These rods carry at their upper parts projecting through the plate 26, at both sides of the same, nuts 29, so that the rods 28 will participate in the movement of the plate.

The lower ends of the rods carry covers 30 adapted to fit on top of the muffin pans 14 and to be moved against the tops of the pans through openings 30 in a plate 32 removably secured to the inner frame of the machine.

As shown in Figs. 2 and 3 the ends of the plate project as at 33 over the frame which rests on legs 34.

The machine operates as follows—

Muffin dough is brought or fed into the machine through the hopper 18 and the crank 23 is operated to actuate the gears 20 and rods 24 and 25 to raise the rods 28 and covers 30 of the pans 14. The dough will then fill the pans 14 and when the crank 23 is then operated to press the covers 30 down upon the top of the pans 14 it will completely fill the same with dough and when the covers are raised a little the filled pans resting with their bottom tenons in the sockets 12 of the plate 11 can all be removed at once and transferred to the baking oven.

While in the foregoing description the preferred form of my machine has been described it will be clear that changes may be made in the construction of its minor details or arrangement of parts without deviating from the scope of my invention.

Having thus described my invention, what I claim and desire to secure by Letters Patent of the United States is as follows—

In a machine of the character described, a frame, a hopper on said frame for supplying muffin dough to the machine, a removable muffin pan carrier in said frame below said hopper, a plurality of covers one for each of the pans on said carrier, a rod for each of said covers, a sliding plate through which the upper ends of said rods extend, nuts on said rods to both sides of said sliding plate and for securing said rods to said plate, bars for guiding said sliding plate during its up and down motion, a plurality of gears, vertical rods secured to the front faces of the two outer gears and to said sliding plate and an operating gear meshing with one of said plurality of gears for vertically displacing said plate, rods and covers, and means allowing a ready removal of said pan carrier from the machine.

In testimony whereof I have affixed my signature.

NYKOLAJ M. LESIUK.